United States Patent [19]

Longman et al.

[11] Patent Number: 5,008,687
[45] Date of Patent: Apr. 16, 1991

[54] DATA STORAGE MEDIUM

[75] Inventors: Robert J. Longman, Coton; Peter R. Helfet; Michael J. Abrams, both of London, all of England

[73] Assignee: Plasmon Limited, Royston, England

[21] Appl. No.: 309,343

[22] Filed: Feb. 9, 1989

[30] Foreign Application Priority Data

Feb. 9, 1988 [GB] United Kingdom ............... 8802930

[51] Int. Cl.$^5$ .................... G01D 9/00; B32B 3/24; G03C 1/00; B05D 3/00
[52] U.S. Cl. .................... 346/135.1; 427/299; 427/304; 428/333; 428/612; 428/913; 430/495; 430/508; 430/945
[58] Field of Search ............. 346/135.1; 428/913, 428/495, 333, 612; 430/945, 508; 427/299, 304

[56] References Cited

U.S. PATENT DOCUMENTS 4,414,273 11/1983 Wada et al. ..................... 428/336
4,616,237 10/1986 Pettigrew et al. ............... 346/135.1

Primary Examiner—Benjamin R. Fuller
Assistant Examiner—Gerald E. Preston
Attorney, Agent, or Firm—Poms, Smith, Lande & Rose

[57] ABSTRACT

An improved optical data storage medium is responsive to incident electromagnetic radiation, and the surface or a surface region of the medium includes a layer of heat sensitive material which has a textured surface pattern in the form of a regular array of grooves or protuberances, the dimensions of the surface features which constitute said textured surface pattern being in the sub-micron range. The textured surface pattern is overcoated with a thin film of an alloy, said alloy comprising (1) a first component which is at least one of ruthenium, rhodium, palladium, osmium, iridium and platinum; and (2) at least one other metallic element, preferably from Groups Va, VIa, VIIa, and Ib of the Periodic Table of elements according to Mendeleev.

The preferred alloy compositions for such data storage media contain platinum and tungsten. Specific alloy compositions based on platinum/tungsten are also provided, as is the use of certain alloy compositions in providing an overcoating layer for optical data storage media.

15 Claims, 1 Drawing Sheet

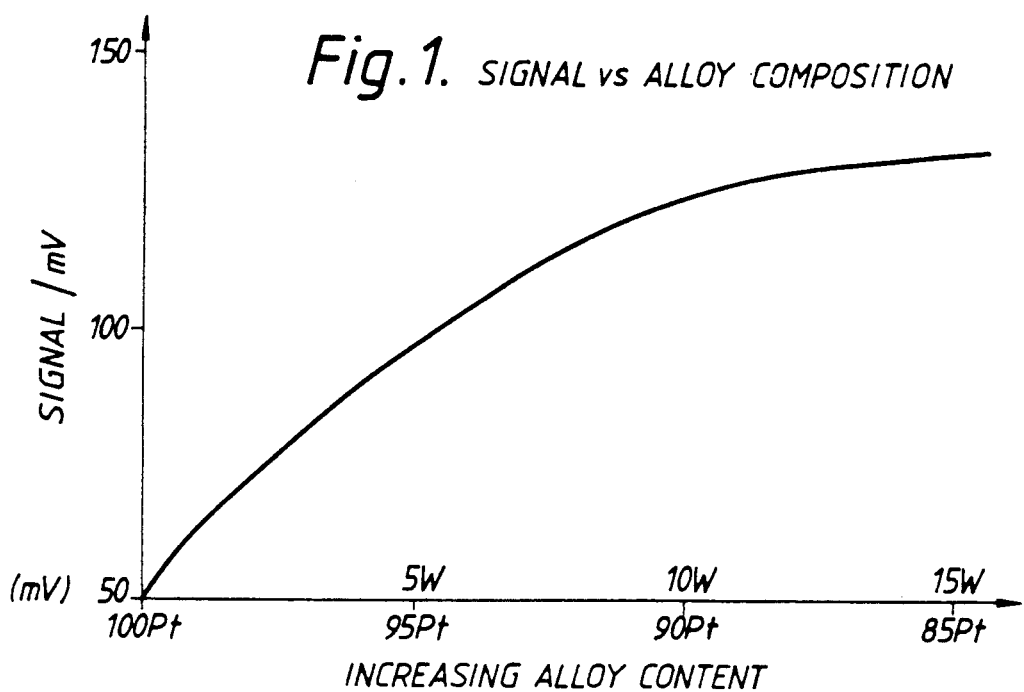
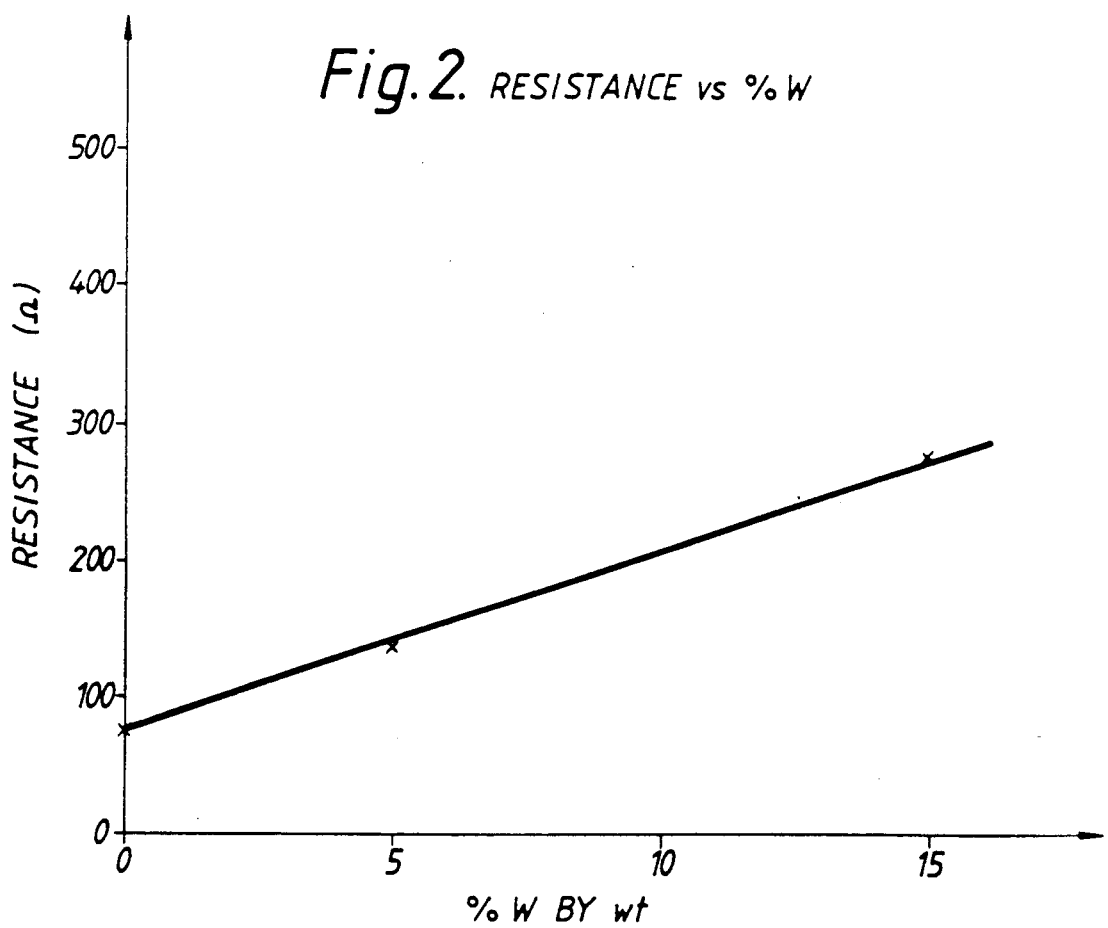

DATA STORAGE MEDIUM

BACKGROUND OF THE INVENTION

This invention relates to a data storage medium of the type described and claimed in U.S. Pat. No. 4,616,237. This patent (and the corresponding published European application No. EP-0107379A) discloses a data storage medium having a surface or a surface region which is strongly absorbant of at least a predetermined band of wavelengths of electromagnetic radiation, whereby the surface or surface region can be written-upon by such radiation, the surface or surface region including a layer of heat sensitive material which has a textured surface pattern which is a regular pattern comprising an arrangement of grooves or protuberances, the pitch of which is smaller than the shortest wavelength within said predetermined band of wavelengths, and the depth (peak-to-trough) of which pattern is at least 100 nm, the textured surface pattern being free from undercutting so as to be suitable for production or replication by moulding, casting, embossing or similar process against a tool, and the textured surface pattern being overcoated with a thin film of a material which has a high opactiy at the predetermined band of wavelengths. Information is stored on said data storage medium by irradiating selected areas on the surface of said medium to heat underlying heat sensitive material and change the local reflectivity of the surface of the medium. The depth of the surface texture may be less than 100 nm, e.g. 25 nm. Once written upon, such data storage media can be read using a read beam which, in many instances, will be in the form of a low power laser beam.

SUMMARY OF THE INVENTION

We have found that, if the data storage medium is subjected to repeated read operations at relatively high laser powers, the data storage medium may deteriorate.

We have now found that the archival longevity of, and/or signal generated when reading, a recorded data storage medium of the type described above can be significantly increased if the overcoating material used in the fabrication of the data storage medium is an alloy. More particularly, in accordance with one aspect of the present invention, there is provided a data storage medium which is responsive to incident electromagnetic radiation and the surface or a surface region of which includes a layer of heat sensitive material which has a textured surface pattern in the form of a regular array of grooves or protuberances, the dimensions of the surface features which constitute said textured surface pattern being in the sub-micron range, and wherein said textured surface pattern is overcoated with a thin film of an alloy, said alloy comprising (1) a first component which is at last one of ruthenium, rhodium, palladium, osmium, irridium an platinum; and (2) at least one metallic element from Groups Va, VIa, VIIa, and Ib of the Periodic Table of elements. The metals of Groups Va, VIa, VIIa and Ib are V, Nb, Ta; Cr, Mo, W; Mn, Tc, Re; and Cu, Ag, Au. Technetium (Tc) is preferably not used because of its radioactivity. Optionally, the alloy defined above may also include one or more of iron, cobalt and nickel.

According to a second aspect of the present invention, there is provided a data storage medium which is responsive to incident electromagnetic radiation and the surface or a surface region of which includes a layer of heat sensitive material which has a textured surface pattern in the form of a regular array of grooves or protuberances, the dimensions of the surface features which constitute said textured surface pattern being in the sub-micron range, and wherein said textured surface pattern is overcoated with a thin film of an alloy, said alloy comprising (1) a first component which is a noble metal (which term as used herein includes all of the platinoid metals) or a mixture of noble metals; and (2) at least one other metallic element. Said other metallic element may itself be a noble metal (but different from that or those of said first component).

Preferably, said other metallic element is selected from Groups Va, VIa, VIIa, and Ib of the Periodic Table of elements. Optionally, the alloy defined above may also include one or more of iron, cobalt and nickel.

According to a third aspect of the present invention, there is provided a data storage medium which is responsive to incident electromagnetic radiation and which includes a layer of heat sensitive material which has a textured surface pattern in the form of a regularly repeating pattern, e.g. an array of grooves or protuberances, the dimensions of the surface features which constitute said textured surface pattern being in the sub-micron range, and wherein said textured surface pattern is overcoated with a thin film of an alloy, said alloy comprising (1) a first component which is a noble metal (which term as used herein includes all of the platinoid metals) or a mixture of noble metals; and (2) at least one other metallic element.

According to a fourth aspect of the present invention, there is provided use of an alloy comprising (1) a first component which is at least one of ruthenium, rhodium, palladium, osmium, irridium and platinum; and (2) at least one metallic element from Groups Va, VIa, VIIa, and Ib of the Periodic Table of elements according to Mendeleev as an overcoating layer for optical data storage media.

According to a fifth aspect of the present invention, there is provided an alloy consisting of from 2 to 20% by weight tungsten; from 0 to 10% by weight in toto of one or more of gold, silver and copper; and the balance platinum.

Preferably, an alloy in accordance with this invention consists of from 5 to 18% by weight tungsten; from 0 to 8% by weight gold; and the balance platinum.

DESCRIPTION OF THE PREFERRED EMBODIMENTS

The presently preferred noble metal for use in the alloy composition used to coat the textured surface pattern of a data storage medium in accordance with this invention is platinum. The noble metal or metals which make up said first component are preferably present in the alloy in an amount of 40–95 atomic per cent. The other metallic component, e.g., a metal from one of Groups Va, VIIa and Ib, will make up the remainder of the alloy's composition, except where one or more or iron, cobalt and nickel are present. In such a case, the alloy may contain up to 20 atomic per cent in toto of iron and/or cobalt and/or nickel.

The presently preferred alloys to coat the textured surface pattern of a data storage medium in accordance with this invention are platinum/tungsten, platinum/tungsten/gold, platinum/tungsten/silver, platinum/tungsten/copper, platinum/tungsten/chromium, platinum/gold, platinum/chromium, platinum/copper, and gold/chromium. Alloys containing platinum and tungsten give particularly high output signals after recording, and are therefore more preferred. The presently most preferred range of composition for such alloys is from 2 to 20% by weight tungsten; from 0 to 10% by weight in toto of one or more of gold, silver and copper; and the balance platinum.

The following Examples are given in order to illustrate the invention in greater detail.

EXAMPLE 1

A first data storage disk of the type described and claimed in U.S. Pat. No. 4,616,237 had, as its overcoating metallic layer, a thin film of pure platinum which was 16 nanometres in thickness. The platinum film was deposited onto the disk surface by sputtering. The surface texture of the disk was in the form of an orthogonal "crossed grating" structure whose depth (peak to trough) was 100 nanometres and whose pitch (i.e. periodicity) was 300 nanometres. The disk was formatted and recorded using laser optics working at 780 nanometres and a power of 8 milliwatts, and was then subjected to continuous repeated reading also with laser optics at 780 nanometres, but at a power level of 1 milliwatt.

Other data storage disks, identical to the first disk except in the composition of their overcoating metallic layer, were produced and tested in the same manner as described above. The composition of each of the disks involved in the tests is shown in the table below:

TABLE

| Disk 1 | Disk 2 | Disk 3 | Disk 4 | Disk 5 |
|---|---|---|---|---|
| Pt 100 | Pt 75/ Au 25 | Pt 80/ Cu 2 | Pt 75/ Cr 25 | Au 75/ Cr 25 |

After 12 hours continuous reading, there was evident read damage of disk 1 — the output signal from the reading head was reduced by 30% in comparison with its initial value. In contrast, each of disks 3, 4 and 5 showed no diminution of output even after 200 hours continuous reading.

EXAMPLE 2

The procedure of Example 1 was repeated, except that different overcoating metallic layers were used, and the signal recording conditions were; disk rotation, 900 r.p.m.; laser power, 7 mW; laser wavelength, 800 nm; numerical aperture, 0.5; and signal frequency, 1.6 MHz. Under standard read conditions — i.e. using the same laser but at a power level of 1 mW — the signal strength obtained for different metallic coatings (whose composition is indicated in parts by weight) was as shown in Table 2 below:

TABLE 2

| Metallic Coating | Signal (mV) |
|---|---|
| 100 Pt | 50 |
| 85 Pt 15W | 130 |
| 80 Pt 15W 5 Au | 190 |

We have also found that the electrical resistance of a Pt/W alloy increases linearly with tungsten content, at least over relatively low proportions of tungsten (0-20%). This increase in electrical resistance is accompanied by a corresponding ability to withstand high temperatures (i.e. thermal resistance). These properties are desirable for optical data storage disks where the recording mechanism involves ablation of a material (e.g. a plastics material) which undergoes a large volume change on degradation, the material being located beneath a thin metal coating which retains its integrity throughout the recording process (i.e. it does not rupture, but changes its physical configuration in a way which alters the localised reflectivity of the disk).

The effects of increasing the proportion of tungsten in the alloy used in accordance with the present invention are illustrated in the accompanying drawings, in which:

FIG. 1 is a plot of the output signal from an optical data storage disk (whose structure and recording characteristics were as described above in Example 2) against the percentage of tungsten in the Pt/W alloy; and FIG. 2 is a plot of the electrical resistance of test samples of alloy having predetermined physical form and produced in identical manner except for the proportion of tungsten present in the alloy.

FIG. 1 shows that, as the tungsten content of the alloy is increased, the output signal from a recorded disk increases significantly. FIG. 2 shows that the electrical resistance of an alloy based on Pt/W increases substantially linearly with the amount of tungsten present.

We claim:

1. A data storage medium which is responsive to incident electromagnetic radiation and the surface of a surface region of which includes a layer of heat sensitive plastics material which undergoes a large volume change upon degradation and which has a textured surface pattern in the from of a regular array of grooves or protuberances, the dimensions of the surface features which constitute said textured surface pattern being in the sub-micron range, and wherein said textured surface pattern is overcoated with a thin film of an alloy, said thin alloy film and the surface region of said plastics material in contact with said thin alloy film together constituting a recording layer which undergoes a change in response to said incident electromagnetic radiation whereby said thin alloy film is deformed from its original physical configuration without undergoing rupture, said alloy comprising (1) a first component which is at least one of ruthenium, rhodium, palladium, osmium, iridium and platinum; and (2) at least one metallic element from Groups Va, VIa, VIIa, and Ib of the Periodic Table of elements according to Mendeleev; and said film conforming substantially to said textured surface pattern, and said thin film constituting means for absorbing said electromagnetic energy without impairing the continuity of said thin film and conducting energy from said incident electromagnetic radiation to cause degradation of said plastics material which undergoes a local volume change and correspondingly changes the surface configuration of said thin film for, the recordation of information.

2. A data storage medium as claimed in claim 1, 2, further characterised in that said alloy further includes one or more of iron, cobalt and nickel.

3. A data storage medium as claimed in claim 1, characterised in that said alloy comprises from 2 to 20% by weight tungsten; and 0 to 10% by weight in toto of one or more of gold, silver and copper; and the balance platinum.

4. A recording medium as defined in claim 1 wherein said storage medium has a recording means consisting solely of said layer of plastics material and said thin film of an alloy.

5. A data storage medium which is responsive to incident electromagnetic radiation and the surface or a surface region of which includes a layer of heat sensitive plastics material which undergoes a large volume change upon degradation and which has a textured surface pattern in the form of a regular array of grooves or protuberances, the dimensions of the surface features which constitute said textured surface pattern being in the sub-micron range, and in which said textured surface pattern is overcoated with a thin film of an alloy, said thin alloy film and the surface region of said plastics material in contact with said thin alloy film together constituting a recording layer which undergoes a change in response to said incident electromagnetic radiation whereby said thin alloy film is deformed from its original physical configuration without undergoing rupture, said alloy comprising (1) a first component which is a noble metal (which term as used herein includes all of the platinoid metals) or a mixture of noble metals; and (2) at least one other metallic element; and said film configuring substantially to said textured surface pattern, and said thin film constituting means for absorbing said electromagnetic energy without impairing the continuity of said thin film and conducting energy to cause degradation of said plastics material which undergoes a local volume change and correspondingly changes the surface configuration of said thin film for the recordation of information.

6. A data storage medium as claimed in claim 5, further characterised in that said alloy further includes one or more of iron, cobalt and nickel.

7. A data storage medium as claimed in claim 5 characterised in that said alloy comprises from 2 to 20% by weight tungsten; from 0 to 10% by weight in toto of one or more of gold, silver and copper; and the balance platinum.

8. A data storage medium as claimed in claim 5, further characterised in that said alloy includes at least one metallic element from Groups Va, VIa, VIIa, and Ib of the Periodic Table of elements according to Mendeleev.

9. A data storage medium as claimed in claim 8 further characterised in that said alloy further includes one or more of iron, cobalt and nickel.

10. A data storage medium which is responsive to incident electromagnetic radiation and which includes a layer of heat sensitive plastics material which undergoes a large volume change upon degradation and which as a textured surface pattern in the form of a regularly repeating pattern, the dimensions of the surface features which constitute said textured surface pattern being in the sub-micron range, and wherein said textured surface pattern is overcoated with a thin film of an alloy, said thin alloy film and the surface region of said plastics material in contact with said thin alloy film together constituting a recording layer which undergoes a change in response to said incident electromagnetic radiation whereby said thin alloy film is deformed from its original physical configuration without undergoing rupture, said alloy comprising (1) a first component which is a noble metal (which term as used herein includes all of the platinoid metals) or a mixture of noble metals; and (2) at least one other metallic element; said film conforming substantially to said textured surface pattern, and said thin film constituting means for absorbing said electromagnetic energy without impairing the continuity of said thin film and conducting energy to cause degradation of said plastics material which undergoes a local volume change and correspondingly changes the surface configuration of said thin film for the recordation of information.

11. A data storage medium as claimed in claim 10, further characterised in that said alloy includes at least one metallic element from Groups Va, VIa, VIIa, and Ib of the Periodic Table of Elements according to Mendeleev.

12. A data storage medium as claimed in claim 10 further characterised in that said alloy further includes one or more of iron, cobalt and nickel.

13. A data storage medium as claimed in claim 10 characterised in that said alloy comprises from 2 to 20% by weight tungsten; from 0 to 10% by weight in toto of one or more of gold, silver and copper; and the balance platinum.

14. A method comprising the steps of:
   forming a data storage medium which is responsive to incident electromagnetic radiation and the surface or a surface region of which includes a layer of heat sensitive plastics material which undergoes a large volume change upon degradation and which has a textured surface pattern in the form of a regular array of grooves or protuberances, the dimensions of the surface features which constitute said textured surface pattern being in the sub-micron range;
   overcoating said textured surface pattern with a thin film of an alloy, said thin alloy film and the surface region of said plastics material in contact with said thin alloy film together constituting a recording layer which undergoes a change in response to said incident electromagnetic radiation whereby said thin alloy film is deformed from its original physical configuration without undergoing rupture, said alloy comprising (1) a first component which is at least one of ruthenium, rhodium, palladium, osmium, iridium and platinum, and (2) at least one metallic element from Groups Va, VIa, VIIa, and Ib of the Periodic Table of elements according to Mendeleev said film conforming substantially to said textured surface pattern, and said thin film being for absorbing said electromagnetic energy without impairing the continuity of said thin film and conducting energy from said incident electromagnetic radiation to cause degradation of said plastics material which undergoes a local volume change and correspondingly changes the surface configuration of said thin film for the recordation of information; and
   applying electromagnetic radiation to said overcoated storage medium.

15. A method comprising the steps of:
   forming a data storage medium which is responsive to incident electromagnetic radiation and the surface or a surface region of which includes a layer of heat sensitive plastics material which in undergoes a large volume change upon degradation and which has a textured surface pattern in the form of a regular array of grooves or protuberances, the dimensions of the surface features which constitute said textured surface pattern being in the sub-micron range;
   overcoating said textured surface pattern with a thin film of an alloy, said thin alloy film and the surface region of said plastics material in contact with said thin alloy film together constituting a recording layer which undergoes a change in response to said incident electromagnetic radiation whereby said thin alloy film is deformed from its original physical configuration without undergoing rupture, said alloy comprising (1) a first component which is a noble metal (which term as used herein includes all of the platinoid metals) or a mixture of noble metals, and (2) at least one other metallic element, said film conforming substantially to said textured surface pattern, and said thin film being for absorbing said electromagnetic energy without impairing the continuity of said thin film and conducting energy to cause degradation of said plastics material which undergoes a local volume change and correspondingly changes the surface configuration of said thin film for the recordation of information; and applying electromagnetic radiation to said overcoated storage medium.

* * * * *